Figure 1:
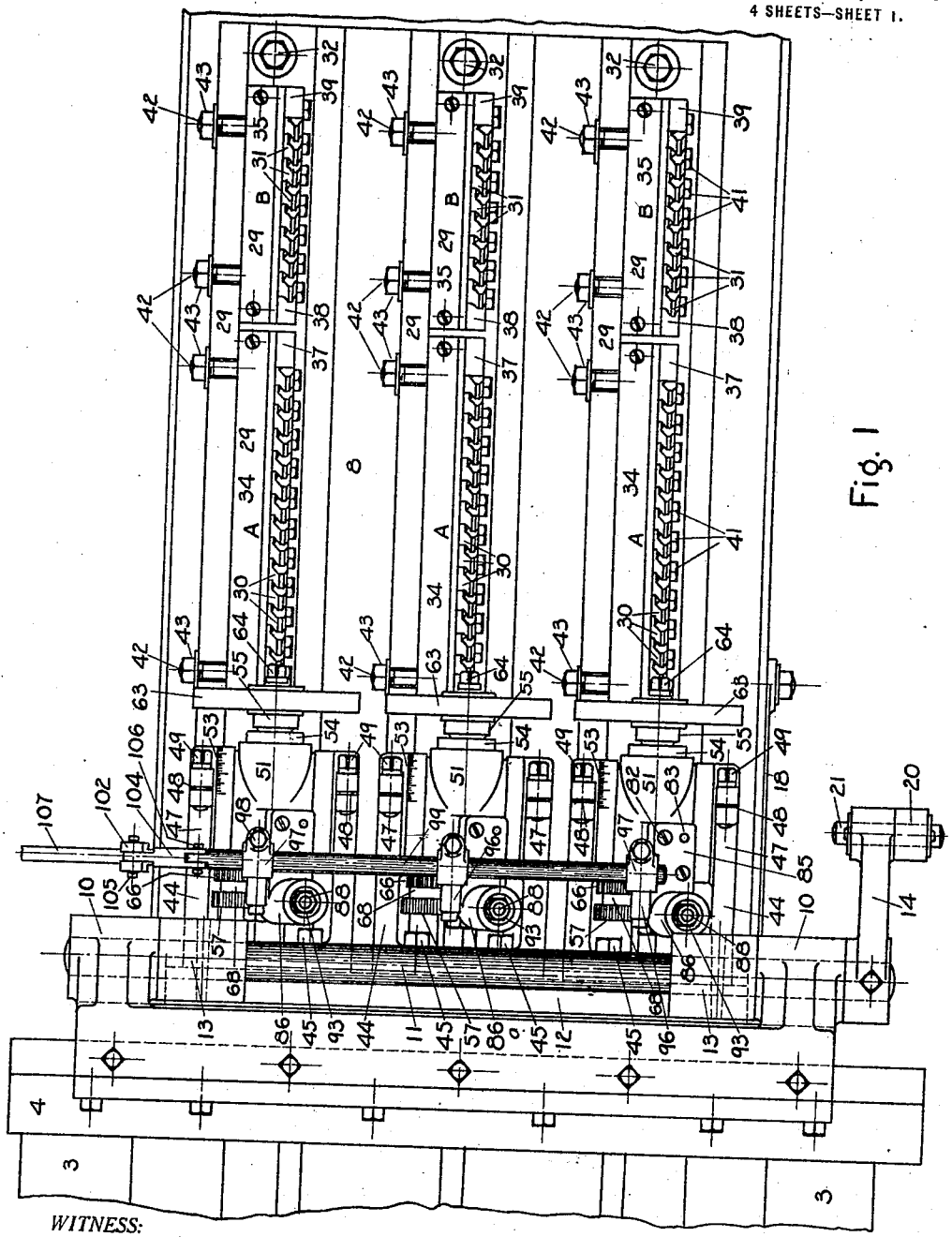

J. L. PERKINS, F. W. SICKLES, AND J. OAKLEY.
MULTIPLE GEAR CUTTING MACHINE.
APPLICATION FILED JULY 15, 1920.

1,430,252.

Patented Sept. 26, 1922.
4 SHEETS—SHEET 1.

WITNESS:
Earle J. Hessetton

INVENTOR.
Julian L. Perkins,
BY Frank W. Sickles,
John Oakley,
Frank A. Cutter
ATTORNEY.

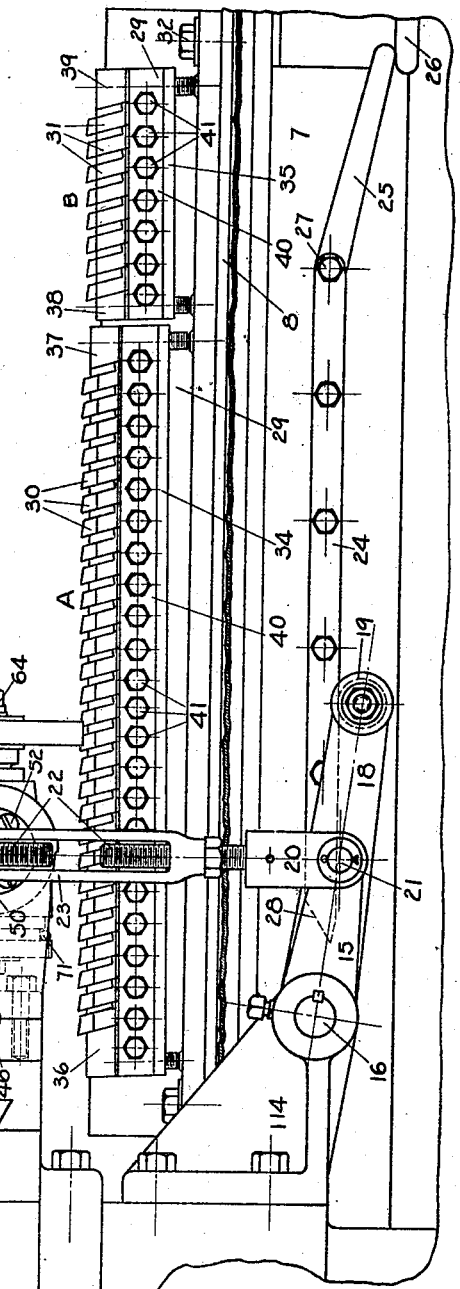

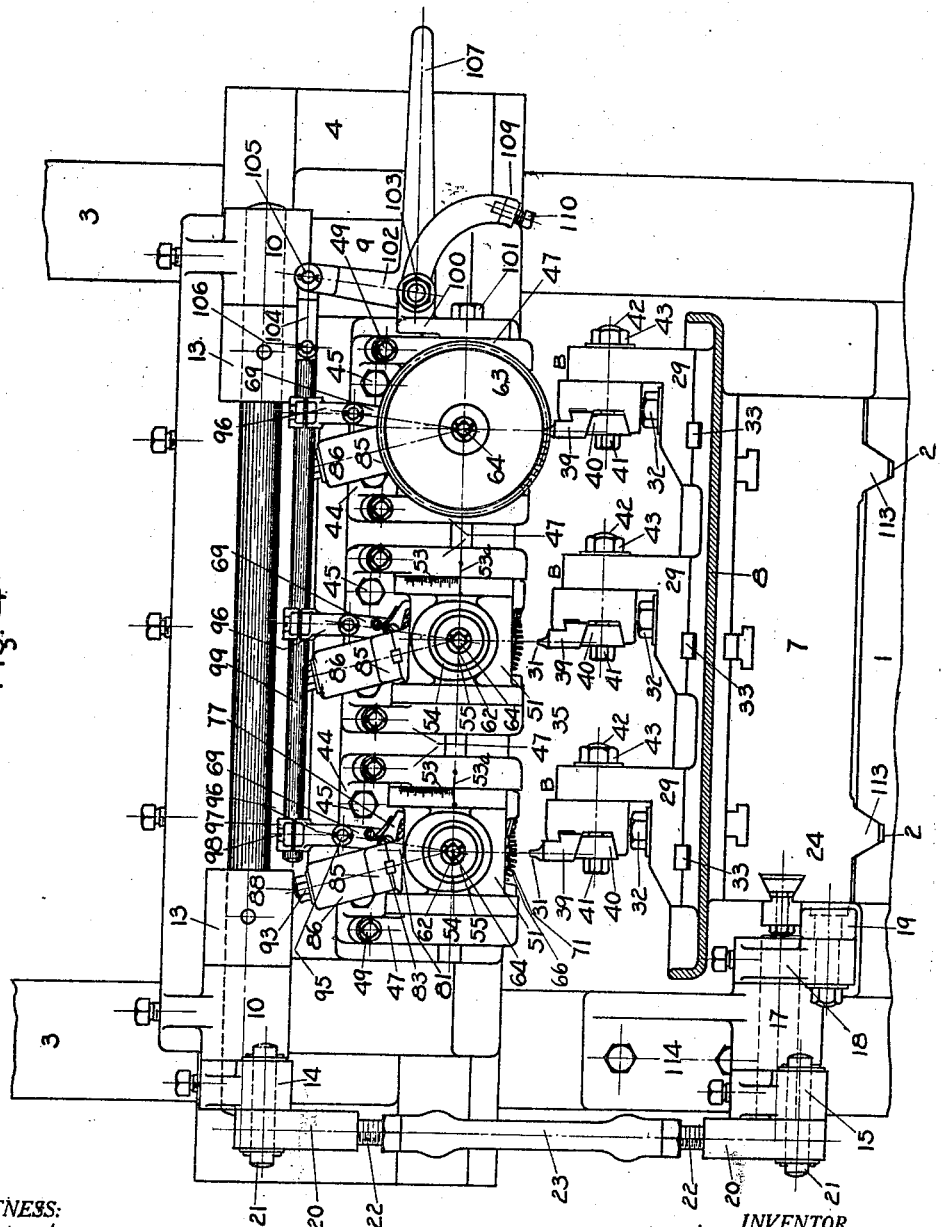

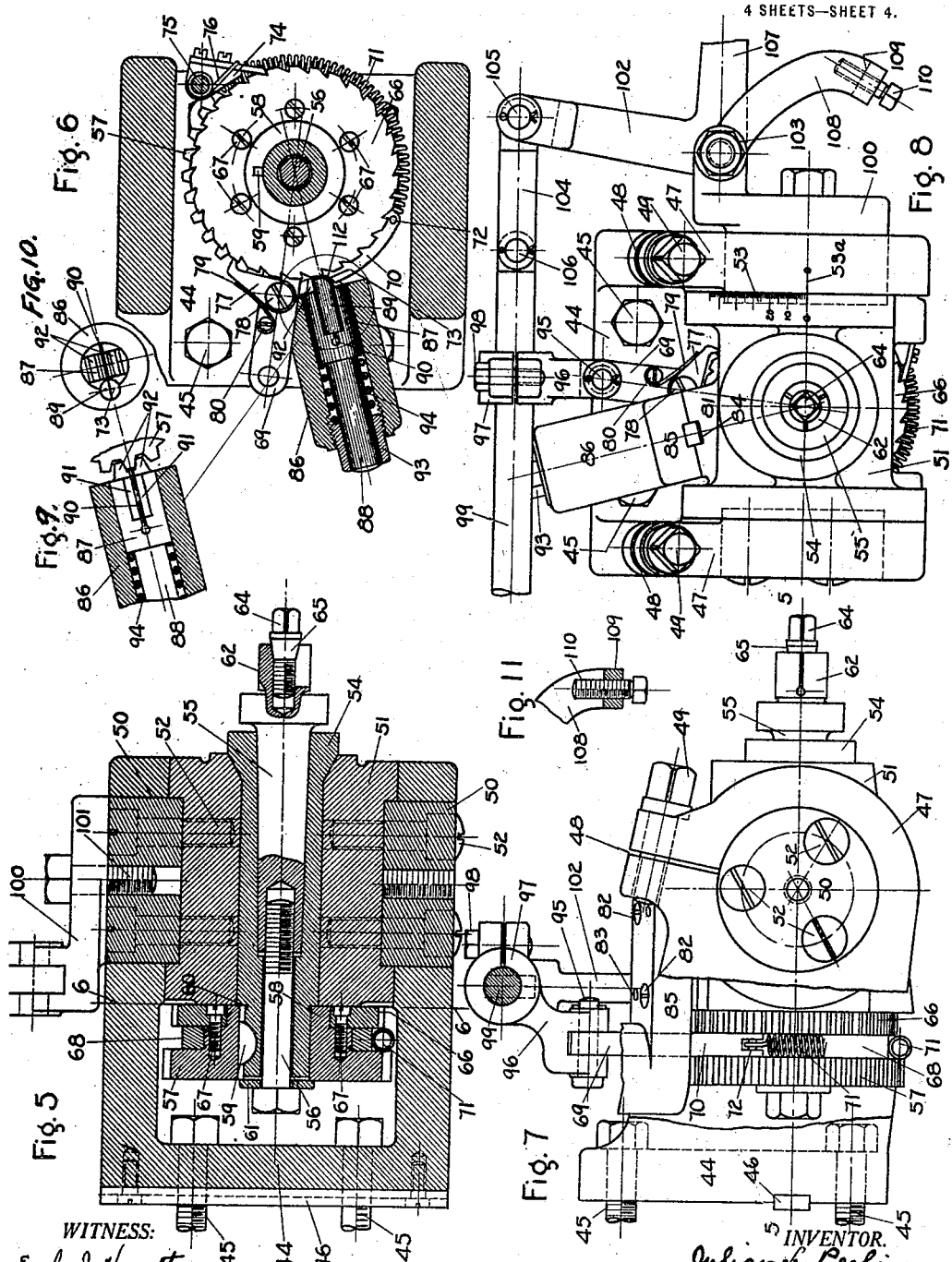

Patented Sept. 26, 1922.

1,430,252

UNITED STATES PATENT OFFICE.

JULIAN L. PERKINS, OF WEST SPRINGFIELD, AND FRANK W. SICKLES AND JOHN OAKLEY, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

MULTIPLE GEAR-CUTTING MACHINE.

Application filed July 15, 1920. Serial No. 396,495.

*To all whom it may concern:*

Be it known that we, JULIAN L. PERKINS, a citizen of the United States of America, and a resident of West Springfield, in the county of Hampden and State of Massachusetts, FRANK W. SICKLES, a citizen of the United States of America, and a resident of Springfield and in said county and State, and JOHN OAKLEY, a subject of the King of England, residing at said Springfield, Massachusetts, have invented a new and useful Multiple Gear-Cutting Machine, of which the following is a specification.

Our invention relates to improvements in machines for cutting spur-gears, bevel-gears, racks, and the teeth in other elements of a more or less similar nature, and consists generally of certain peculiar work-holding means, such means being adjustable for the purpose of supporting either spur-gear or bevel-gear blanks while the same are being cut, certain peculiar indexing means or mechanism for the work, with manually-operated means for actuating said indexing means or mechanism and thus indexing said work-holding means and the work supported thereby, and such other auxiliary and subsidiary parts and members as may be necessary or desirable in order to render the machine complete and serviceable in every particular, all as hereinafter set forth.

This invention is in some respects in the nature of an improvement of the multiple gear-cutting machine which forms the subject of our application for United States Letters Patent, Serial No. 333,987.

Although the machine illustrated in connection herewith is provided with three work-holders, it is obvious that there might be more or less than that number, and that a machine might be built which was provided with only one such holder, in which event a single gear only could be cut at a time, unless two or more blanks were placed together on the supporting member therefor of said holder.

The primary object of our invention is to provide a machine which is capable of cutting one or a plurality of gear blanks, which machine, while comparatively inexpensive and simple in construction and operation, is strong and durable, and largely automatic in its action, although provided with means for indexing the work-holding elements by hand instead of automatically, which in some cases and for some purposes is an advantage. It is possible to produce with this machine a large amount of work in a comparatively short period of time.

A further object of our invention is to provide a machine of this character with means whereby the same may be employed for cutting either spur-gears or bevel-gears, the only act necessary in order to change from one type of gear cutting to the other being to make certain adjustments, which can be done easily and quickly. The adjustable means provided for changing from one type of gear cutting to the other, or from one kind of bevel-gear to another, is sufficiently accurate and delicate to enable the machine to be so set as to insure the proper cutting of any bevel-gear, as well as any spur-gear, which the machine is designed to handle.

Another object is to provide the machine with improved indexing mechanism.

Other objects and advantages will appear in the course of the following description.

We employ in this machine compound broaches or cutters similar to those employed in the machine which is the subject of the aforesaid application. These broaches or cutters are arranged side by side on a reciprocating bed or support, and each is a compound element comprising a set of roughing or stocking cutting units and a set of finishing cutting units, the former preceding the latter.

A preferred embodiment of our invention, whereby we attain the objects and secure the advantages of the same, is illustrated in the accompanying drawings, and we will proceed to describe said invention with reference to said drawings, although it is to be understood that the form, construction, arrangement, etc. of the parts and members in various aspects are not material, and may be modified without departure from the spirit of the invention.

In the drawings, in which similar characters of reference designate similar parts throughout the several views, Figure 1 is a top plan of the essential parts of a multiple gear-cutting machine which embodies a practical form of our invention as aforesaid, the machine being set for cutting spur-gears, and the compound cutters, or the roughing or stocking cutting units thereof, being on their way through the three spur-gear blanks mounted in position in said machine; Fig. 2, a side elevation of said parts of said machine, the near side of the bed-plate being broken away; Fig. 3, a side elevation of one of the work-holders, showing the same in position for supporting a bevel-gear blank during the cutting operation, and having such a blank connected therewith or secured thereto; Fig. 4, a front elevation of the parts of the machine shown in the first two views, the bed-plate upon which the compound cutters are directly supported being in cross section; Fig. 5, an enlarged, transverse, horizontal section through one of the work-holders and the indexing members associated therewith and supported thereby, taken on lines 5—5, looking down, in Fig. 7; Fig. 6, an enlarged, transverse section taken on lines 6—6, looking toward the left, Fig. 5; Fig. 7, an enlarged side elevation of one of the work-holders, showing the same disposed as in Figs. 1, 2, and 4, for carrying or supporting spur-gear blanks, a portion of the near bracket arm being broken out, and certain members broken away, to disclose parts that otherwise would be hidden; Fig. 8, an enlarged, front elevation of said work-holder; Fig. 9, an enlarged detail in partial section of certain of the locking members which form parts of the indexing mechanism; Fig. 10, an enlarged, inner end or bottom plan of the lock plunger with its pin and teeth, and of the cylinder therefor, and, Fig. 11, an enlarged detail of the stop for the operating arm or handle of the manually-operated indexing mechanism.

Upon referring to the drawings it will be seen that the frame of the machine, or so much of it as is required for a full understanding of the invention, comprises a horizontal bed 1 having therein V-shaped grooves or ways 2—2, and provided with uprights 3—3, a cross-piece, support, or cross-head 4 attached to the faces or front sides, that is to say, the sides nearer the front end of said bed, of said uprights, and a reciprocating, platen or carriage 7 having bottom, V-shaped members 113—113 to slide in said grooves or ways. The support or cross-head 4 is attached to the uprights 3 by means which render such cross-head adjustable vertically, such means being common in planer construction. A bed-plate 8 is mounted on and securely attached to the carriage 7. Suitable means are provided for reciprocating the carriage 7, such as the means illustrated in the said pending application.

The compound cutters, three in number in this case, are arranged in parallel relation on the bed-plate 8, and travel with the carriage 7, while the work-holders and indexing devices for the work, which are more or less intimately combined, and comprise three in number as do said cutters, are supported from and by the cross-head 4, in line with or proper relation to said cutters. Means are required for raising the gear blanks out of the paths of the compound cutters, at the end of the active stroke of said cutters, so as to enable the latter to return to initial position without contacting with said blanks, and means are required also for indexing the work at this time. The former means is automatically operated, while the latter means is operated by hand in the present machine, all in the manner hereinafter explained.

Mounted on the front of the cross-head 4, is a horizontal plate 9, which is provided on top at the ends with bearings 10—10. Journaled in the bearings 10 is a rock-shaft 11, and depending from said shaft is an oscillatory plate, clapper, or hanger 12, said hanger having lugs 13—13 at the top which are secured to said rock-shaft 11 outside of the forward bearing 10. A rocker-arm 14 is secured to the rock-shaft 11 outside of the forward bearing 10, said arm extending to the right from said shaft. Normally the hanger 12 stands vertically and is in contact with the plate 9 behind, which plate forms an abutment for said hanger.

The terms "front" and "rear", or equivalent terms, and their derivatives, as used herein, generally refer to the side of the machine which is nearer to and to that which is farther from the observer, respectively, on the one hand, and to the right-hand side or end of the parts and members and to the left-hand side or end of the parts and members, respectively, transversely of the machine, on the other hand. There is an exception made to this general rule, however, when the direction of movement of the carriage 7 and the parts and members carried thereby is referred to, since the carriage is said to advance when the movement is toward the work or to the left, or such movement is described by some equivalent term or terms, although the carriage is then moving toward what we here term the rear end of the machine.

A rocker-arm 15 is secured to a short, horizontal rock-shaft 16 at the outer end thereof, said arm being directly below the arm 14. The rock-shaft 15 is journaled in a bearing 17 at the right-hand end of a bracket 114 which is secured to the face of the front upright 8 below the cross-head 4. A rocker-arm 18 is secured to the rock-shaft 16 at the inner end thereof, and extends to the right from said shaft. The bearing 17 is between the rocker-arms 15 and 18 or between the hubs thereof.

The free end of the rocker-arm 18 is equipped with a roll 19 on the inside. There is an approximately vertical connection, between the rocker-arms 14 and 15, consisting of upper and under heads 20—20 pivotally attached at 21—21 to said rocker-arms, and screw-threaded extensions 22 which are connected by a turn-buckle 23. By means of the turn-buckle 23 the distance between the pivots 21 may be increased or decreased, so that the proper adjustment of the parts may be readily effected.

Upward movement of the rocker-arm 18 actuates the rock-shaft 16 and the rocker-arm 15 and causes the forward end of the rocker arm 14 to swing upwardy through the medium of the connection between said arms 15 and 14, when the rock-shaft 11 is actuated in such a manner as to swing the hanger 12 forward and upward away from the face of the plate or abutment 9, thus elevating or raising whatever may be carried by said hanger. The downward movement of the rocker-arm 18 causes or permits the hanger 12 to be returned to position in contact with the abutment plate 9, and the parts and members carried by said hanger to be lowered, the medium through which said hanger is swung downwardly and rearwardly, or is permitted to do so, when said rocker-arm swings downwardly, being the intervening connections between said hanger and rocker-arm, as in the first instance. The downward movement of the rocker-arm 18 with its roll 19 is limited by the abutment 9 with which the hanger 12 then contacts.

The means for operating the rocker-arm 18, so that it will cause the hanger 12 to be swung forwardly and upwardly, consists of a rail 24, a switch 25, and a rail 26, a portion only of said latter rail appearing, in Fig. 2. The rail 24 is a horizontal member secured to the front side of the carriage 7 in such a position that the left-hand end of said rail can clear the roll 19, when said carriage arrives at the right-hand end of its travel. The rail 26 is also a horizontal member which is attached to the same side of the carriage 7 as the rail 24, but said rail 26 is on a lower plane than is said rail 24. The left-hand end of the switch 25 is pivoted at 27 to the right-hand end of the rail 24. The switch 25 is long enough to enable the right-hand terminal thereof to rest on the rail 26.

As the carriage 7 moves from right to left the rail 26 passes over and beyond the roll 19, the switch 25 rides on to said roll and is swung upwardly out of contact with the rail 26, and the latter passes beneath said roll. The length of the rail 26 and the movement thereof with the carriage 7 are sufficient to permit the switch 25 to ride off of the roll 19 and drop down again onto said rail by the time said carriage arrives at the left-hand end of its travel. The roll 19 is now in the path of the free terminal of the switch 25, when said switch is carried to the right by the carriage 7, therefore, as said carriage moves to the right, after being reversed, said switch is carried beneath said roll and elevates the same, due to the fact that the switch has a downward incline to the right from its pivotal point to its free end, when the latter rests on the rail 26. The rocker-arm 18, which carries the roll 19, is swung upwardly with said roll until the rail 24 passes beneath said roll. Then the roll 19 is maintained in its elevated position until the rail 24 passes from beneath said roll, which it does as the carriage 7 approaches the right-hand end of its travel. The upward incline of the switch 25 is sufficient to produce the required amount of movement, on the part of the hanger 12, to raise the parts and members carried by said hanger to the extent required, and the length of the rail 24 is sufficient to maintain the elevated parts and members in raised position the required length of time. When the rail 24 passes from beneath the roll 19, as it does at the end of the right-hand travel of the carriage 7, said roll is permitted to drop behind said rail. The roll 19 drops low enough to permit the rail 24 to pass over it when the carriage 12, with its attached and connected parts and members, swings down by gravity against the abutment 9. The left-hand end of the rail 24 is beveled from above downwardly and toward the left, as represented at 28, in order to enable said rail to ride from under the roll 19 without producing jar or shock.

The parts and members thus far described, and the parts and members which make up the compound cutters and which I will next describe briefly, are similar in construction and operation to corresponding parts and members in the previous application.

Each of the three compound cutters, shown in connection with the present embodiment of our invention, consists of a support 29, and a roughing or stocking cutter A and a finishing cutter B mounted on and attached to said support, and said roughing and finishing cutters comprise respectively cutting units 30 and 31. The supports 29 are angular in cross section, and arranged in parallel relation to each other on the bed-plate 8 lengthwise thereof, being attached to said bed-plate and securely held against independent movement of any kind by means of bolts 32 and splines 33. The roughing cutter and the finishing cutter, of each compound cutter, consist in part of a long holder 34 and a short holder 35, respectively. The holders 34 and 35 and the parts and members attached thereto and held thereby are substantially alike, the principal differences being in matters of length, number of cutting units, and shape of cutting parts. End blocks 36 and 37 are provided for each row of cutting units 30, and end blocks 38 and 39 are provided for each row of cutting units 31. The holders 34 and 35 have top and bottom flanges between which the cutting units 30 and 31, respectively, are received, and by means of which and of wedge-bars 40 and cap-screws 41 said cutting units are securely held in place in said holders. The holders themselves are secured to the upstanding parts of the supports 29 by means of bolts 42 and nuts 43.

Each cutting unit 30 has a cutting portion which is narrower than the finished slot in the gear blank which is cut in part by said unit, while each cutting unit 31 has a cutting portion of the same width as that of said slot, so that said last-named cutting unit with its companion cutting units makes the finishing cut whereby said slot is produced in its completed state. The cutting units 30 first cut the slot of the proper depth, but of slightly less width than is required for the finished slot, and then the cutting units 31 take off a little on both sides of the slot cut by said units 30, thus cutting said slot to width and at the same time forming the curves in the sides of said slots which constitute in part the sides of two of the finished gear teeth, assuming that said cutting units 30 produce no curvatures. In other words, the cutting units 30 are sufficiently smaller than the slot to be cut to permit the cutting units 31 to give the required form or shape to said slot. The cutting units herein shown are for involute gear teeth. For cycloidal teeth some change in the general shape of the cutting units would be required.

I will now take up in detail the new features of the present machine. These comprise the work-holding and -indexing mechanism or mechanisms. Said mechanisms are supported from and carried by the oscillatory hanger 12, and they are manually operated to index the work in the manner presently to be explained.

Although three compound cutters and the same number of work-holders and indexing devices are shown in the present machine, it is evident that such number may vary, as hereinbefore observed. There will more frequently, however, be a greater than a less number of compound cutters and work-holders and work-indexing devices.

Three U-shaped brackets 44 are rigidly attached to and held in place with their backs against the face of the oscillatory hanger 12, and their arms or sides projecting forwardly, by means of a pair of bolts 45 and a spline 46 for each bracket, said bolts passing through the back side of the bracket into said hanger, being tapped into the latter, and said spline being let into coinciding, longitudinally-extending slots in contiguous or adjacent faces of said bracket and hanger. The brackets 44 are arranged side by side. The forward-end portions of the arms of each bracket 44 form bearings 47, and such portions or bearings are split through the top, as represented at 48, to form or convert such bearings into split bearings. A bolt 49 passes through the forward lip of the split portion of each of the aforesaid bearings, extends across the slot 48 therein, and is tapped into and through the adjacent lip of such bearing. By means of its bolt 49 each bearing 47 can be tightened onto the object embraced therein, or can be loosened so as to enable such object to be rotatively adjusted. A hub 50 is journaled or mounted in each bearing 47, and between the hubs in the arms of each bracket 44 is a block 51. The hubs 50 in each pair are let into opposite sides of each block 51, and rigidly attached thereto by means of screws 52 which are received in and pass through said hubs and are tapped into said sides of said block. The blocks 51 fit snugly between the arms of the brackets 44 and between the hubs 47, and said blocks have annular side flanges provided with scales 52, there being one such scale on the periphery in front of one of such flanges in each pair. A mark 53$^a$ is provided on the periphery of each of the bearings 47 that is adjacent to each block flange upon which the scale 52 appears, and with which mark said scale cooperates. Upon loosening the bolts 49, of any pair of bearings 47, the block 51 supported between such bearings and having its hubs 50 journaled therein, can be rotatively adjusted, for the purpose presently to be explained, whereby the position of the longitudinal axis, or the axis that is at right-angles to the axis of said hubs, of said block, is changed, the amount of such adjustment and change being readily ascertained or determined by means of the mark 53$^a$ delineated on one of said bearings and the scale delineated on one of the flanges of said block.

A sleeve 54 occupies the axial center of each block 51, which center is at right-angles to the axial center of said block which passes through the axial centers of its hubs 50. The sleeve 54 extends beyond both ends of its block 51, and has at the outer or forward terminal an enlarged, tapered head the tapered portion of which fits a correspondingly tapered portion at the outer terminal of the bore in said block for said sleeve. An arbor 55 is inserted in the sleeve 54, said arbor being tapered throughout that portion thereof which is received in said sleeve, and the latter having a tapered opening or passage therein to receive the tapered part of said arbor. A bolt 56 is passed through a bore in the inner terminal of the sleeve 54, and has its inner terminal, that is to say, the inner terminal of said bolt, tapped into the inner terminal of the arbor 55 which is in said sleeve. An index-wheel 57 having a hub 58 is mounted on the inner terminal portion of each sleeve 54, and is keyed to said sleeve at 59. The hub 58 in front abuts a shouldered part, as 60, of its sleeve 54, and the adjacent end of the block 51 in which said sleeve is located, and said hub extends a little beyond the inner end of said sleeve. A washer 61 is interposed between the head of the bolt 56 and the adjacent side or back of the hub 58 in each case. It is now clear that, when the bolt 56 is tightened, the arbor 55 is drawn into the tapered passage in the sleeve 54 and becomes fixedly secured to said sleeve. The sleeve 54 is capable of rotating in its block 51, and an intermittent, rotary motion is imparted to said sleeve when the index-wheel 57 is actuated, since the latter is secured to the former by means of the key 59 and by reason of the binding contact existing between the hub 58 of said wheel, the washer 61, and the head of the retaining bolt 56. The sleeve 54 when revolved in the block 51 carries with it the arbor 55. A front-end thrust on the arbor 55 tends to force the same into closer or tighter contact, if possible, with its sleeve 54, and the enlarged head of said sleeve counteracts any tendency of such thrust to force the sleeve further in to the block 51.

At the outer end of each arbor 55, beyond what may be termed the actual head thereof, is a split projection 62 upon which a gear blank, as 63, is mounted during the cutting operation. Tapped into the outer end of this split projection is an expanding bolt 64 which has a tapered part 65 between the head and the screw-threaded portion of said bolt. The tapered part 65 fits into the outer end portion of the passage in the projection 62 provided to receive the bolt 64, which outer end portion is also tapered, so that, when said bolt is screwed in, said projection being split is expanded. Thus when the blank 63 is mounted on the projection 62 and the bolt 64 tightened, said projection is expanded against the sides of the bore in said blank and so secures the blank in place on said projection.

A ratchet-wheel 66 is mounted on and secured to the hub 58 of each index-wheel 57, between said wheel and the contiguous block 51, by means of screws 67 that are let into and pass through said ratchet-wheel and are tapped into said hub. Also mounted on the hub 58, between the index-wheel 57 and the ratchet-wheel 66, is an annulus or ring 68 having an upwardly-projecting arm 69. This ring may be termed the index actuator, and the arm 69, the operating arm. The ring 68 also has on one side a cam 70. A spiral-spring 71 has one end attached to a stud 75 and the other end attached at 72 to the heel of the cam 60, said spring lying on the outside or periphery of the ring 68, as best shown in Figs. 6 and 7. A portion of the spring 71 is broken out in Figs. 3 and 7, and a portion of the near arm of the bracket, which appears in Fig. 3, is also broken out. The spring 71 is arranged and adapted to actuate the ring 68, and with it its arm 69, to the left or forward, that is, toward the front side of the machine. The stud 75 extends inwardly from the inner end of the block 51. A detent 74 is mounted on the stud 75, and arranged and adapted to engage the teeth of the ratchet-wheel 66, said stud being properly located to give the required position to said detent, as well as to afford the required anchorage for the attached spring 71. A spring 76 is also attached to the stud 75, and engages the detent 74 in such a manner as to retain the latter in engagement with the ratchet-wheel 66. A pawl 77 is pivotally attached at 78 to the left-hand or front side of the arm 69, in position also to engage the teeth of the ratchet-wheel 66. The pawl 77 is pressed into engagement with the ratchet-wheel 66 by means of a spring 79, which latter has one end attached to a pin 80 and bears at the other end on the upper edge of said pawl, said pin being set in the arm 69 on the same side with and above the pivot 78.

Each block 51 is provided on top with a boss 81 which has an incline from above downwardly and to the left or forwardly, and mounted on and secured to such boss, by means of screws 82, pins 83, and a spline 84, is the base 85 of a cylinder 86. Arranged to reciprocate in the cylinder 86 is an index-locking plunger 87 having a spindle 88 rising from the top thereof. The plunger 87 is split or slotted at the inner or bottom terminal, as represented at 90 in Figs. 6, 9, and 10. A pin 89 is let into one side of the plunger 87 through which the slot 90 opens, said plunger being recessed in said side on both sides of said slot, as best shown at 91—91 in Fig. 9, to receive said pin. Only a portion of the pin 89 sets into the recesses 91. The said pin is supported in the path of the adjacent cam 70, and is a releasing member for the plunger 87 and its teeth 92. The bottom end of the pin 89, which extends below the base or bottom of the plunger 87, is beveled, as shown at 73 in Figs. 6 and 10, to correspond with the beveled end 112 of the cam 70. On the base of the plunger 87, each side of the slot 90 and parallel therewith, is a tooth 92. These teeth extend only to the vicinity of the adjacent side of the pin 89, as will be understood upon referring to Fig. 10, and they are in a position to engage with the teeth of the index-wheel 57. In the upper end of the cylinder 86 is a screw cap or plug 93, and between this plug and the plunger 87, encircling the spindle 88, is a spiral-spring 94. The spring 94 acts to thrust the plunger 87 toward and into engagement with the index-wheel 57, and the force or tension of said spring may be increased or decreased by screwing the plug 93 either in or out of the cylinder 86 accordingly. The space between the two teeth 92 is slightly less than the width of any tooth on the index-wheel 57, consequently, when the spring 94 forces the plunger 87 downwardly and said teeth into engagement with an index-wheel tooth, the latter becomes wedged between the former, so that the index-wheel is held securely and firmly, and accurately in position, the slot 90 in the plunger 87 and opening between the teeth 92 being provided to afford resiliency at the inner end of said plunger for the purpose of insuring engagement of the character described. Each tooth 92 is necessarily a little narrower than any index-wheel tooth.

It will now be seen, that, if the arm 69, of any of the three index devices or mechanisms just described, be actuated to the left or rearwardly, the ring 68 is partially rotated in the same direction, against the resiliency of the spring 71, the cam 70 is forced beneath the pin 89 and forces said pin with the plunger 87 upwardly, against the resiliency of the spring 94, and thereby causes the teeth 92 to be withdrawn from engagement with the index-wheel 57, and at the same time the pawl 77, which is pivotally attached to the arm 69, snaps down into engagement with one of the teeth of the ratchet-wheel 66 and imparts a partial revolution to said ratchet-wheel. In practice the ratchet-wheel is rotated to the right or rearwardly the distance between two of its teeth. When the ratchet-wheel 66 is rotated in this manner the detent 74, which prevents said ratchet-wheel from being rotated in a reverse direction, is actuated, against the resiliency of its spring 76, out of locking engagement with one tooth, and immediately snaps into locking engagement with the next tooth, in the direction of rotation of said ratchet-wheel. Then, when the arm 69 is released and the spring 70 operates to partially rotate the ring 68 to the left and return the parts to initial position, the cam 70, which is under the pin 89 and thereby in a position to hold the teeth 92 out of engagement with the index-wheel teeth, rides from beneath said pin and so permits said index-wheel teeth to engage the next index-wheel tooth, in the direction of rotation of the index-wheel, the spring 94 then acting to thrust downwardly the plunger 87 with its teeth. At this time the pawl 77 is forced out of active engagement with the ratchet-wheel 66, and assumes a position in readiness to act on said ratchet-wheel the next time the arm 69 is actuated from initial position. The parts are so proportioned, arranged, and timed that the pawl commences to rotate the ratchet-wheel as soon as the teeth 92 are clear of the index-wheel, and the detent 74 holds said ratchet-wheel while the arm 69 is returning to initial position and said teeth are reengaging said index-wheel. There is no lost motion or backlash, and accuracy is insured.

In the manner and by the means just described the blanks 63 are intermittently and accurately positioned for the cutting of the slots which form the teeth thereon.

Pivotally attached, at 95, to the top of each arm 69 is an arm 96 having a split bearing 97 provided with a bolt 98 by means of which said arm is secured to a horizontal, index-actuating or operating rod 99 which extends in front of the upper part of the hanger 12, in parallel relation to the rock-shaft 11. The split bearing 97 and the bolt 98 afford ready means for adjustment of the bracket 96 on the rod 99. A bracket 100 is secured to the rearmost hub 50, by means of a bolt 101 tapped into said hub— see Fig. 5. A bell-crank-lever 102 has its elbow pivoted at 103 to the bracket 100, and the upper terminal of said bell-crank-lever is connected with the adjacent end of the rod 99, by means of a link 104, said link being pivotally connected at one end with said lever at 105, and at the other end with said rod at 106. The horizontal part of the bell-crank-lever 102 terminates in a handle 107. A fixed arm 108 curves downwardly and rearwardly from the bracket 100, to which said arm may be rigidly though adjustably attached, or with which it may be integral, and has a rearwardly-extending lug 109 at the bottom—see Fig. 11. A bolt 110 is tapped into and through the lug 109 to form an adjustable stop above said lug for the handle 107 to limit the downward movement thereof and the corresponding or correlative movement of the bell-crank-lever 102, such stop bolt being in the path of said handle or of that part of said bell-crank-lever from which the handle is fashioned.

The bracket 100 is attached to one of the hubs 50 in order that said bracket, together with all attached and connected parts and members, may and shall follow whatever adjustment may be given the block 51 to which said hub is secured. In this connection attention is directed to the fact that all parts of the indexing mechanism are directly or indirectly supported by the blocks 51, wherefore adjustment of said blocks to adapt the work-holders for different types of gears is made not only possible, but easy and convenient.

The bolt 110 is set so as to limit the downward movement of the handle 107 in such a manner as to produce the required amount of movement on the part of the indexing arms 69, whereby the blanks 63 mounted on the arbors 55 are actuated the correct distance, each time that said handle is operated, to cut the teeth on said blanks the proper distance apart. The springs 70 are strong enough to return the indexing mechanism, including the bell-crank-lever 102, to initial position. The indexing arms 69 are operated, when the handle 107 is depressed, through the medium of the bell-crank-lever 102, the link 104, the rod 99, and the arms 96.

When the blocks 51 are set so that the arbors 55 are positioned horizontally, as shown in most of the views, the work-holders are set for cutting spur-gear blanks, but when said blocks are set so as to position said arbors obliquely, as shown in Fig. 3, said work-holders are set for cutting bevel-gear blanks, one of which is represented at 111 in said last-named view. These different positions are obtained by loosening the bolts 49, partially rotating the hubs 50 in the arms of the brackets 44, using the indices 53 and 53$^a$ as guides for such adjustment, and retightening said bolts. When the work-holders are set to cut bevel-gears, the blanks for such gears are supported by their arbors 55 in position to permit the compound cutters to cut the teeth in said blanks at the proper angle. What is meant here by the proper angle is the angle which the inner wall, or what may be termed the bottom of any gear-tooth slot cut by one of the compound cutters, forms with the axis of the gear blank.

Assuming that the work-holders are set for cutting spur-gear blanks, and that the three blanks 63 are in place on the arbors 55, with the three compound cutters, or rather the three roughing cutters A and the three finishing cutters B, properly adjusted to cut the depth of slots required in said blanks, and that the carriage 7 has just started on its left-hand or forward travel, the complete operation of the machine is, briefly, described as follows:

As the carriage 7 carries the compound cutters into contact with the spur-gear blanks 63, the cutting parts of the leading cutting units 30 cut shallow grooves in the portions of said blanks which are nearer to or directly over the advancing units, which grooves are deepened as one after the other of said cutting units encounters the blanks and passes through and beneath them, until slots of the full depth are formed. Then the foremost cutting parts of the advancing cutting units 31 encounter the blanks 63 and commence to widen the slots from below, continuing such widening operation until the last of said last-named cutting parts has passed through said slots and converted them into finished slots. The hanger 12, meanwhile, is in its vertical position against the face of the abutment 9, and the gear-blank-holding members are in their low position and support the blanks 63 in proper position for the operation thereon of the compound cutters.

After the last cutting units 31 have made their cuts, the carriage 7 is reversed and returns to the starting point again. Meanwhile the roll 19 has passed beneath the switch 25 onto the rail 26, after rocking said switch upwardly, and the latter has dropped down behind said roll. The travel of the carriage 7 is so timed or the parts and members are so proportioned, that, before the right-hand ends of the compound cutters, on their return stroke, arrive in position to contact with the blanks 63, the inclined switch 25 has passed beneath and elevated the roll 19, with attached members or the members operated thereby, high enough to enable said cutters to clear said blanks. This result is produced by the mechanism which is operated by the roll 19, and which when operated thereby at this time rocks the hanger 12 on the rock-shaft 11 upwardly and outwardly, and so raises the work-holders high enough to take the blanks 63 out of the path of the cutters.

As the carriage continues to move to the right the switch 25 passes from beneath the roll 19, and the rail 24 passes beneath said roll. The blanks 63 are now in their most elevated position and so continue until the rail 24 rides from beneath the roll 19.

While the hanger 12 is in the position which tilts the blanks 63 upwardly and for a short space of time retains them in such position, the operator depresses the handle 107 until it comes into contact with the stop-bolt 110. This action rocks the arms 69 rearwardly or to the right and thereby releases the index-wheel 57 from the plunger teeth 92, and actuates the ratchet-wheel 66 with said index-wheel the required distance for the spacing of two teeth on each blank 63. The operator then releases the handle 107, when the springs 70 contract to cause or permit the plunger teeth 92 to re-engage the index-wheels 57 and lock the same. The blanks 63 are now ready to be swung down into the cutting field or into position for the next advance stroke of the compound cutters.

It should be noted in passing that the teeth on the index-wheel 57 correspond in number with the teeth which are cut in the gear-blanks 63.

When the roll 19 drops down from the left-hand end of the rail 24, the hanger 12 is, in consequence of such movement of said roll, permitted to assume its normal position. Uncut portions of the gear-blanks 63 are now presented in proper position to be cut, upon the next forward stroke of the compound cutters.

The operations described above are repeated until all of the teeth on the three blanks 63 have been cut and such blanks converted into spur-gears.

The operation is the same when the work-holders are set for bevel-gear blanks, as 111.

The finished gears are removed from the arbors 55, after loosening the expanding bolts 64, and another set of blanks is placed on said arbors and secured by means of said bolts, in readiness for a repetition of the operations required to convert these blanks into gears.

The gear blanks are indexed to the right.

One gear blank 63 only is shown in Fig. 4.

It is very evident that this invention is applicable for cutting single as well as multiple gears, and for cutting grooves in other articles or objects.

What we claim as our invention, and desire to secure by Letters Patent, is—

1. In a multiple gear-cutting machine, cutting means reciprocable in a straight path, oscillatory supporting means intersecting the vertical plane of such path, work-holding means carried by said second-named means, and means automatically to oscillate said second-named means intermittently.

2. In a multiple gear-cutting machine, cutting means reciprocable in a straight path, oscillatory supporting means intersecting the vertical plane of such path, adjustable work-holding means carried by said second-named means, said work-holding means being capable of having attached thereto different types of gear blanks, and to carry the same in cutting position, and means automatically to oscillate intermittently said second-named means.

3. In a multiple gear-cutting machine, cutting means reciprocable in a straight path, an oscillatory supporting member intersecting the vertical plane of such path, work-holding means carried by said member, said work-holding means being adjustable to adapt the same for different types of gear-blanks, and means automatically to oscillate intermittently said member.

4. In a multiple gear-cutting machine, means to hold a gear blank, cutting means for said blank, means to reciprocate one of said first-two mentioned means, whereby a gear-tooth slot is broached in said blank, when said cutting means and said blank come into contact, automatic oscillatory means to enable the reciprocating element to make its return stroke without contact between said blank and said cutting means, and manually-operated indexing means for said blank, whereby a gear-tooth slot may be broached in said blank each time said cutting means is brought into contact therewith.

5. In a multiple gear-cutting machine, means to hold a gear blank, cutting means for said blank, means to reciprocate said cutting means, automatic oscillatory means to enable said cutting means to make its return stroke without contacting with said blank, and manually-operated indexing means for said blank, whereby a gear tooth slot may be broached in said blank at each active stroke of said cutting means.

6. The combination, in a multiple gear-cutting machine, with a reciprocating carriage, and cutting means on said carriage, of an oscillatory hanger, work-holding and indexing means attached to said hanger, operating means controlled by said carriage for said hanger, and manual means for operating said work-indexing means.

7. In a multiple gear-cutting machine, a gear-blank arbor, a rotatable supporting member for said arbor, an index-wheel and a ratchet-wheel mounted on said member, an index-locking member for said index-wheel, and locking, releasing, and actuating means for said ratchet-wheel.

8. In a multiple gear-cutting machine, a gear-blank arbor, a rotary support for said arbor, an index-wheel and a ratchet-wheel mounted on said support, means to lock, release, and actuate said ratchet-wheel, and a plunger provided with teeth to engage the index-wheel teeth.

9. In a multiple gear-cutting machine, a gear-blank arbor, a rotary support for said arbor, an index-wheel and a ratchet-wheel mounted on said support, locking, releasing, and actuating means for said ratchet-wheel, and a plunger having teeth to engage said index-wheel teeth, said plunger being split between its teeth to enable the latter to grip each index-wheel tooth which they engage.

10. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and means, consisting in part of an arm, for actuating said locking, releasing, and actuating means for said ratchet-wheel, and said locking and releasing means for said index-wheel, whereby the latter has imparted thereto a partial revolution, of means for actuating said arm.

11. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and means, consisting in part of an arm, for actuating said locking, releasing, and actuating means for said ratchet-wheel, and said locking and releasing means for said index-wheel, whereby the latter has imparted thereto a partial revolution, of manually-operated means for actuating said arm.

12. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and operating means, consisting in part of an arm, for said locking, releasing, and actuating means for said ratchet-wheel, and for said locking and releasing means for said index-wheel, of a suitably mounted bell-crank-lever, a rod, an arm attached to said rod and pivotally connected with said first-named arm, and a link connecting said bell-crank-lever and said rod.

13. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and operating means, consisting in part of an arm, for said locking, releasing, and actuating means for said ratchet-wheel, and for said locking and releasing means for said index-wheel, of a suitably mounted bell-crank-lever, a rod, an arm attached to said rod and pivotally connected with said first-named arm, a link connecting said bell-crank-lever and said rod, and a stop to limit the movement of said bell-crank-lever in one direction.

14. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and operating means, consisting in part of an arm, for said locking, releasing, and actuating means for said ratchet-wheel, and for said locking and releasing means for said index-wheel, of a suitably mounted bell-crank-lever, a rod, an arm attached to said rod and pivotally connected with said first-named arm, a link connecting said bell-crank-lever and said rod, and an adjustable stop to limit the movement of said bell-crank-lever in one direction.

15. The combination, in a multiple gear-cutting machine, with a gear-blank arbor, a rotary support for said arbor, an index-wheel and a ratchet-wheel mounted on said support, locking, releasing, and actuating means for said ratchet-wheel, locking and releasing means for said index-wheel, and operating means, consisting in part of an arm, for said locking, releasing, and actuating means for said ratchet-wheel, and for said locking and releasing means for said index-wheel, of a suitably mounted bell-crank-lever, a rod, an arm attached to said rod and pivotally connected with said first-named arm, a link connecting said bell-crank-lever and said rod, a suitably supported arm having a lug, and a bolt tapped into and through said lug to provide an adjustable stop for said bell-crank-lever.

16. The combination, in a multiple gear-cutting machine, with a rotatably-adjustable block, a bracket connected with said block, an arbor carried by said block, and indexing means for said arbor, also carried by said block, of manually-operated actuating means for said indexing means, said actuating means consisting in part of a bell-crank-lever pivotally attached to said bracket.

17. The combination, in a multiple gear-cutting machine, with a rotatably-adjustable block, a bracket and stop member connected with said block, an arbor carried by said block, and indexing means for said arbor, also carried by said block, of manually-operated actuating means for said indexing means, said actuating means consisting in part of a bell-crank-lever pivotally attached to said bracket, and in the path of which said stop member is located.

18. The combination, in a multiple gear-cutting machine, with a rotatably-adjustable member, of a gear-blank arbor, indexing members for said arbor, and actuating means for said indexing members, all carried by said rotatably-adjustable member.

19. In a multiple gear-cutting machine, indexing mechanism comprising an index-wheel, and a split tooth-provided locking member to engage and release said index-wheel.

20. In a multiple gear-cutting machine, indexing mechanism comprising an index-wheel, a tooth-provided spring-pressed locking plunger for said index-wheel, and means to actuate said plunger out of engagement with said index-wheel.

21. The combination in a multiple gear-cutting machine, with an index-wheel, of an adjacent cylinder, a spring-pressed tooth-provided locking plunger in said cylinder for said index-wheel, and means to actuate said plunger out of engagement with said index-wheel.

22. The combination, in a multiple gear-cutting machine, with an index-wheel, of an adjacent cylinder, a tooth-provided spring-pressed split locking plunger in said cylinder for said index-wheel, and means to actuate said plunger out of engagement with said index-wheel.

23. The combination, in a multiple gear-cutting machine, with an index-wheel, of an adjacent cylinder, a tooth-provided spring-pressed locking plunger in said cylinder for said index-wheel, and a pin let into one side of said plunger, of means to engage said pin and thereby actuate said plunger out of engagement with said index-wheel.

24. In a multiple gear-cutting machine, a bracket, a block supported by said bracket, a sleeve arranged in said block for rotation, a gear-blank arbor secured to said sleeve, an index-wheel and a ratchet-wheel mounted on and secured to said sleeve, a ring loosely mounted and contiguous to said ratchet-wheel, said ring being provided with an arm and a cam, a spring arranged to actuate said ring in one direction, a detent arranged to engage said ratchet-wheel and hold the same against rotation in one direction, a pawl carried by said arm to engage said ratchet-wheel and actuate the same in the other direction, a plunger having teeth to engage said index-wheel, and provided with a member which lies in the path of said cam, and means to actuate said arm and ring against the force of said spring.

25. The combination, in a multiple gear-cutting machine, of a bracket, a block supported by said bracket, a shouldered sleeve arranged in said block for rotation, a gear-blank arbor having a taper fit in said sleeve, an index-wheel mounted on said sleeve, with the hub of said index-wheel contiguous to the shoulder on said sleeve, a bolt extending into the inner terminal of said sleeve and tapped into the inner terminal of said arbor, a washer interposed between said hub of said index-wheel and the head of said bolt, a ratchet-wheel secured to said index-wheel, a ring loosely mounted on a supporting part of said index-wheel, between the latter and said ratchet-wheel, said ring having an arm and a cam, a spring arranged to actuate said ring in one direction, a detent for said ratchet-wheel, a pawl for said ratchet-wheel, said pawl being pivotally connected with said arm, a locking plunger having teeth for engagement with said index-wheel, and provided with a member which extends into the path of said cam, and means to actuate said arm and ring against the force of said spring.

26. In a multiple gear-cutting machine, a bracket, a block mounted in said bracket, a sleeve arranged in said block for rotation, a gear-blank arbor secured to said sleeve, an index-wheel and a ratchet-wheel mounted on and secured to said sleeve, a ring loosely mounted contiguous to said ratchet-wheel, said ring being provided with an arm and a cam, a spring arranged to actuate said ring in one direction, a detent arranged to engage said ratchet-wheel and hold the same against rotation in one direction, a pawl carried by said arm to engage said ratchet-wheel and actuate the same in the other direction, a plunger having teeth to engage said index-wheel, and provided with a member which lies in the path of said cam, and means to actuate said arm and ring against the force of said spring.

27. In a multiple gear-cutting machine, a bracket, a rotatively-adjustable block mounted in said bracket, a sleeve arranged in said block for rotation, a gear-blank arbor secured to said sleeve, an index-wheel and a ratchet-wheel mounted on and secured to said sleeve, a ring loosely mounted contiguous to said ratchet-wheel, said ring being provided with an arm and a cam, a spring arranged to actuate said spring in one direction, a detent arranged to engage said ratchet-wheel and hold the same against rotation in one direction, a pawl carried by said arm to engage said ratchet-wheel and actuate the same in the other direction, a plunger having teeth to engage said index-wheel, and provided with a member which lies in the path of said cam and means to actuate said arm and ring against the force of said spring, said means being connected with said block so that it moves therewith when the block is adjusted.

28. In a multiple gear-cutting machine, a bracket, a block mounted in said bracket, a sleeve arranged in said block for rotation, a gear-blank arbor secured to said sleeve, an index-wheel and a ratchet-wheel mounted on and secured to said sleeve, a ring loosely mounted contiguous to said ratchet-wheel, said ring being provided with an arm and a cam, a spring arranged to actuate said ring in one direction, a detent arranged to engage said ratchet-wheel and hold the same against rotation in one direction, a pawl carried by said arm to engage said ratchet-wheel and actuate the same in the other direction, a plunger having teeth to engage said index-wheel, said plunger being split between its teeth, and provided with a member which lies in the path of said cam, and means to actuate said arm and ring against the force of said spring.

29. In a multiple gear-cutting machine, cutting means reciprocable in a straight path, an oscillatory supporting member, work-holding means carried by said member, said work-holding means being adjustable to adapt the same to different types of gear-blanks, means automatically to oscillate intermittently said member, and work-indexing means carried by said work-holding means.

30. In a multiple gear-cutting machine, an oscillatory supporting member, a plurality of work-holders carried by said member, said holders being adjustable to adapt the same to different types of gear blanks, and means adapted to be operated at one point to index simultaneously the work carried by said work holders.

JULIAN L. PERKINS.
FRANK W. SICKLES.
JOHN OAKLEY.

Witnesses:
F. A. CUTTER,
A. C. FAIRBANKS.